US012758877B2

(12) United States Patent
Jimenez et al.

(10) Patent No.: US 12,758,877 B2
(45) Date of Patent: Oct. 13, 2026

(54) GENERATING A MUSICAL SCORE FOR A GAME

(71) Applicant: Sony Interactive Entertainment Inc., Tokyo (JP)

(72) Inventors: Daniel Israel Pereira Jimenez, London (GB); Estefania Rodriguez Quiros, London (GB); Lazaros Michailidis, London (GB); Jesus Lucas Barcias, London (GB); Christopher William Henderson, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 196 days.

(21) Appl. No.: 18/443,515

(22) Filed: Feb. 16, 2024

(65) Prior Publication Data

US 2024/0286037 A1 Aug. 29, 2024

(30) Foreign Application Priority Data

Feb. 23, 2023 (EP) .................................... 23386017

(51) Int. Cl.

*A63F 13/54* (2014.01)
*A63F 13/60* (2014.01)
*G10H 1/00* (2006.01)

(52) U.S. Cl.

CPC .............. *A63F 13/54* (2014.09); *A63F 13/60* (2014.09); *G10H 1/0025* (2013.01);
(Continued)

(58) Field of Classification Search

CPC .. A63F 13/54; A63F 13/60; A63F 2300/6018; G10H 1/0025; G10H 1/0066;
(Continued)

(56) References Cited

U.S. PATENT DOCUMENTS 9,098,579 B2 * 8/2015 Luo ......................... G06F 16/48
12,230,252 B2 * 2/2025 Sharifi .................... G06F 3/167
(Continued)

OTHER PUBLICATIONS

Extended European Search Report for corresponding EP Application No. 23386017.0, 9 pages, dated Jul. 20, 2023.
(Continued)

*Primary Examiner* — Allen Chan
(74) *Attorney, Agent, or Firm* — Kilpatrick Townsend & Stockton LLP

(57) ABSTRACT

A music generation apparatus for generating information indicative of a musical score for a game, the apparatus including communication circuitry to communicate with an entertainment device, the communication circuitry being configured to receive a request to generate a musical score for a game, and to receive one or more keywords output by the entertainment device during processing of the game, the one or more keywords being indicative of one or more of an action and/or a condition associated with a user playing the game and the game state. The music generation apparatus also comprises music generation circuitry responsive to the request and each of the one or more keywords to generate the information indicative of the musical score in dependence on that keyword. An entertainment device is also provided, as well as a system, methods and computer programs.

13 Claims, 5 Drawing Sheets

101

(52) U.S. Cl.
CPC ..... *G10H 1/0066* (2013.01); *G10H 2210/026* (2013.01); *G10H 2210/111* (2013.01); *G10H 2240/311* (2013.01)

(58) Field of Classification Search
CPC ....... G10H 2210/026; G10H 2210/111; G10H 2240/311
USPC .......................................................... 463/35
See application file for complete search history.

(56) References Cited

U.S. PATENT DOCUMENTS 12,347,409 B1 * 7/2025 Venti .................... G10H 1/0025
2020/0406144 A1 * 12/2020 Estanislao .............. A63F 13/87

OTHER PUBLICATIONS

Adam Tomothey, et al., "Procedurally generated, adaptive music for rapid game development," Foundations of Digital Games 2014, 7 pages, Apr. 16, 2014.
Prafulla Dhariwal, et al., "Jukebox: A Generative Model for Music," arxiv.org, Cornell University Library, 20 pages, Apr. 30, 2020.
Plans David, et al., "Experience-Driven Procedural Music Generation for Games," IEEE Transactions on Computations Intelligence and AI in Games, vol. 4, No. 3, pp. 192-198, Sep. 30, 2012.

* cited by examiner

GENERATING A MUSICAL SCORE FOR A GAME

BACKGROUND

The present technique relates to the field of video game music.

Video games often include a musical score or soundtrack comprising audio to be played alongside the associated video data. A video game soundtrack is typically generated when developing the game, and comprises one or more audio files which are provided with the game data of the video game. For example, the soundtrack may be made up of multiple tracks that play one after another in a pre-defined order. However, in some games, the order in which the tracks are played may be dependent on in-game events.

Some video games employ algorithmic music generation, in which a soundtrack is constructed in real time, based on in-game events, from a collection of sound samples (small snippets of audio). However, while this approach provides some degree of personalisation in the soundtrack, the extent to which the soundtrack can be personalised is limited by the number of sound samples provided. Hence, it would be advantageous to provide soundtrack with a greater degree of personalisation.

SUMMARY

In a first example of the present technique, a music generation apparatus for generating information indicative of a musical score for a game is provided. The music generation apparatus includes communication circuitry to communicate with an entertainment device. The communication circuitry is configured to receive a request to generate the information indicative of a musical score for a game and receive one or more keywords output by an entertainment device during processing of the game. The one or more keywords are indicative of one or more of an action and/or a condition associated with a user playing the game, and some or all of the game's state. The music generation apparatus includes music generation circuitry responsive to the request to begin generating information indicative of the musical score. The music generation circuitry is responsive to receiving each of the one or more keywords to update the generation of the information indicative of the musical score based on that keyword.

In another example of the present technique, a system is provided. The system includes the music generation apparatus discussed above and an entertainment device. The entertainment device includes processing circuitry to process a game state of the game based on game data, the action, and/or the condition associated with the user playing the game. The entertainment device includes selection circuitry to select, during processing of the game, based on one or more of the action, the condition associated with the user, and/or the game state, the one or more keywords for use in generating information indicative of a musical score for the game.

In another example of the present technique, a method for generating information indicative of a musical score for a game is provided. The method includes receiving a request to generate information indicative of a musical score for a game; receiving one or more keywords output by an entertainment device during processing of the game, the one or more keywords being indicative of one or more of an action and/or a condition associated with a user playing the game and the game state; in response to the request and the or each keyword; and generating the information indicative of the musical score for the game based on the or each keyword.

In another example of the present technique there is provided a computer program including instructions which, when executed, cause a processor to perform the method discussed above.

In another example of the present technique an entertainment device is provided. The entertainment device includes processing circuitry to process a game state of a game based on game data and an action and/or a condition associated with a user playing the game. The entertainment device includes selection circuitry to select, during processing of the game, based on one or more of the action and/or the condition associated with the user and the game state, one or more keywords for use in generating information indicative of a musical score for the game.

In another example of the present technique a method is provided. The method includes processing a game state of a game based on game data, an action, and/or a condition associated with a user playing the game; selecting, during processing of the game, based on one or more of the action and/or the condition associated with the user and the game state, one or more keywords for use in generating information indicative of a musical score for the game.

Further respective aspects and features of the invention are defined in the appended claims.

BRIEF DESCRIPTION OF THE DRAWING

Embodiments of the present invention will now be described by way of example with reference to the accompanying drawings, in which.

DETAILED DESCRIPTION

Figure 1:
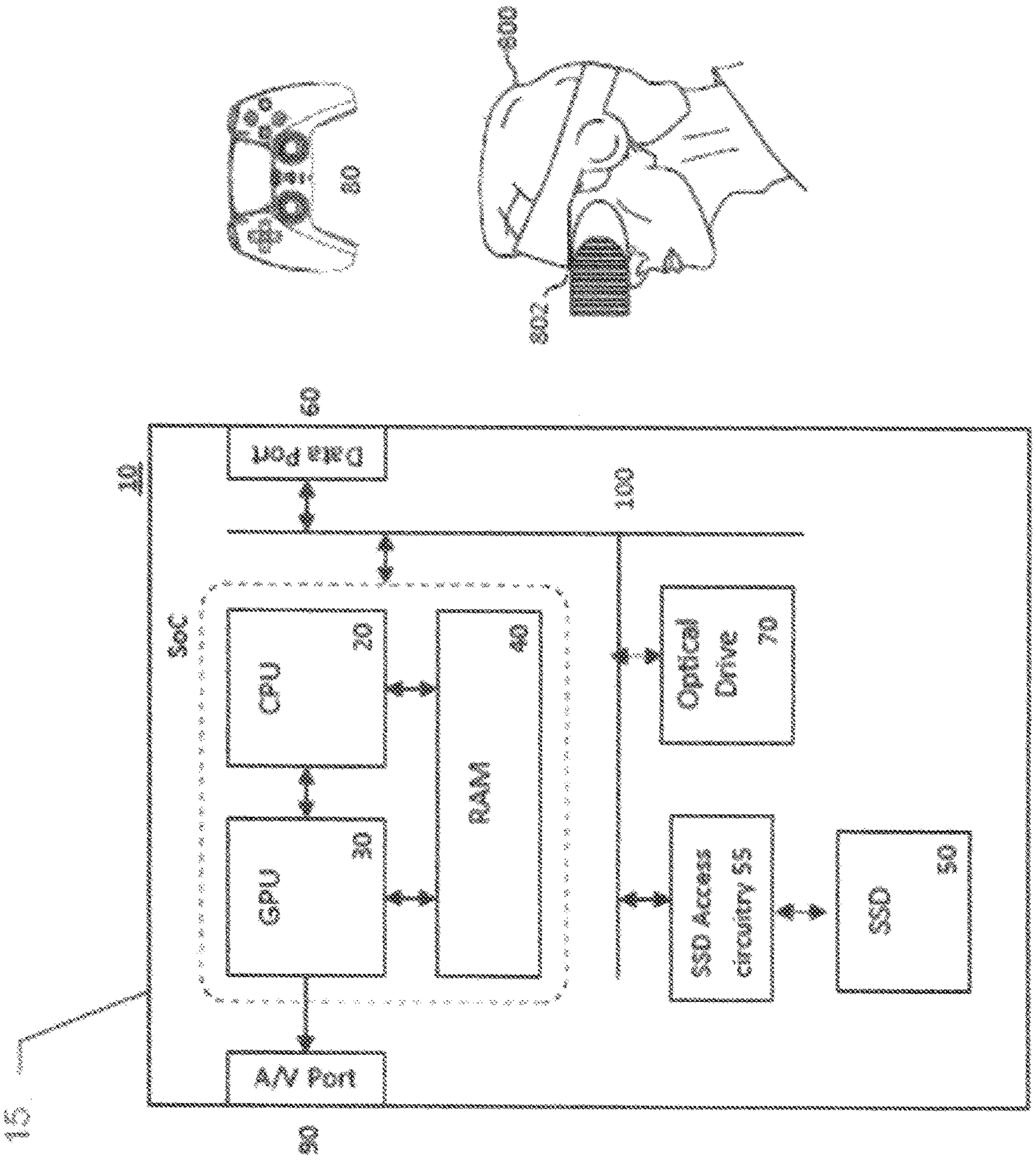
FIG. 1 shows an example of an entertainment system.

FIG. 1 shows an example of an entertainment system 10, which comprises an entertainment device 15 (which could for example include a computer or console such as the Sony® PlayStation 5® (PS5)), a display device such as a head-mounted display (HMD) 802 and one or more hand-held controllers 80.

The entertainment device 15 comprises a central processor 20 (also referred to as processing circuitry or a central processing unit (CPU)). This may be a single or multi core processor, for example comprising eight cores as in the PS5. The entertainment device also comprises a graphical processing unit or GPU 30. The GPU can be physically separate to the CPU or integrated with the CPU as a system on a chip (SoC) as in the PS5. Either the CPU 20 or the CPU in combination with the GPU 30 may be an example of processing circuitry to generate game content for a game based on game assets.

The entertainment device 15 also comprises RAM 40, and may either have separate RAM for each of the CPU and GPU, or shared RAM as in the PS5. The RAM can be physically separate or integrated as part of an SoC as in the PS5. Further storage is provided by a disk 50, either as an external or internal hard drive, or as an external solid-state drive, or an internal solid-state drive as in the PS5. Access circuitry 55 is also provided to access data (such as game content) stored on the disk 50.

The entertainment device 15 may transmit or receive data via one or more data ports 60, such as a USB port, Ethernet® port, Wi-Fi® port, Bluetooth® port or similar, as appropriate. It may also optionally receive data via an optical drive 70.

Interaction with the device 15 is typically provided using one or more handheld controllers 80, such as the DualSense® controller in the case of the PS5. For example, the handheld controllers 80 may detect user inputs and provide user input data to the entertainment device 15. User input data may be provided to the entertainment device via a cable connecting the controllers to the entertainment device (e.g., connecting to the data ports 60) or via a wireless connection (e.g., Bluetooth®, Wi-Fi®, etc.).

Audio/visual outputs from the entertainment device are typically provided through one or more A/V ports 90, or through one or more of the wired or wireless data ports 60. For example, the processing circuitry 20, 30 of the entertainment device may generate game content (e.g., image data and audio data) based on game assets received by any of the reception circuitry, and output the game content via the A/V ports 90 or the wired or wireless data ports 60. The processing circuitry 20, 30 may also output a musical score or soundtrack for the game via the AV ports 90 of the wired or wireless data ports 60. Alternatively, the entertainment device may transmit the game assets directly to a display device, and processing circuitry of the display device may generate the game content (in which case the processing circuitry of the display device may be the processing circuitry to generate game content for the game based on game assets).

The display device may be a display screen such as a monitor or television screen (e.g., LCD screen, LED screen, etc.) connected to the entertainment device, and the display screen and speakers may be accessible to the entertainment device via the A/V port 90 or the data ports 60 to receive the audio/visual outputs. Alternatively, a display screen and/or speakers could be integrated as part of the entertainment device, or as part of a HMD, worn by a user 800. For example, an HMD may be used to provide improved immersion, especially in virtual reality (VR) games.

One or both of the HMD 802 or the controller 80 may also comprise one or more sensors to detect physiological conditions of the user 800—for example, the one or more sensors may detect one or more of a temperature, heartrate, eye movements, seating, blinking, motion or any other physiological condition of the user—and to output, to the entertainment device, signals representing the detected physiological conditions.

Where components described above are not integrated with the entertainment device 15, they may be connected as appropriate either by a dedicated data link or via a bus 100.

Figure 2:
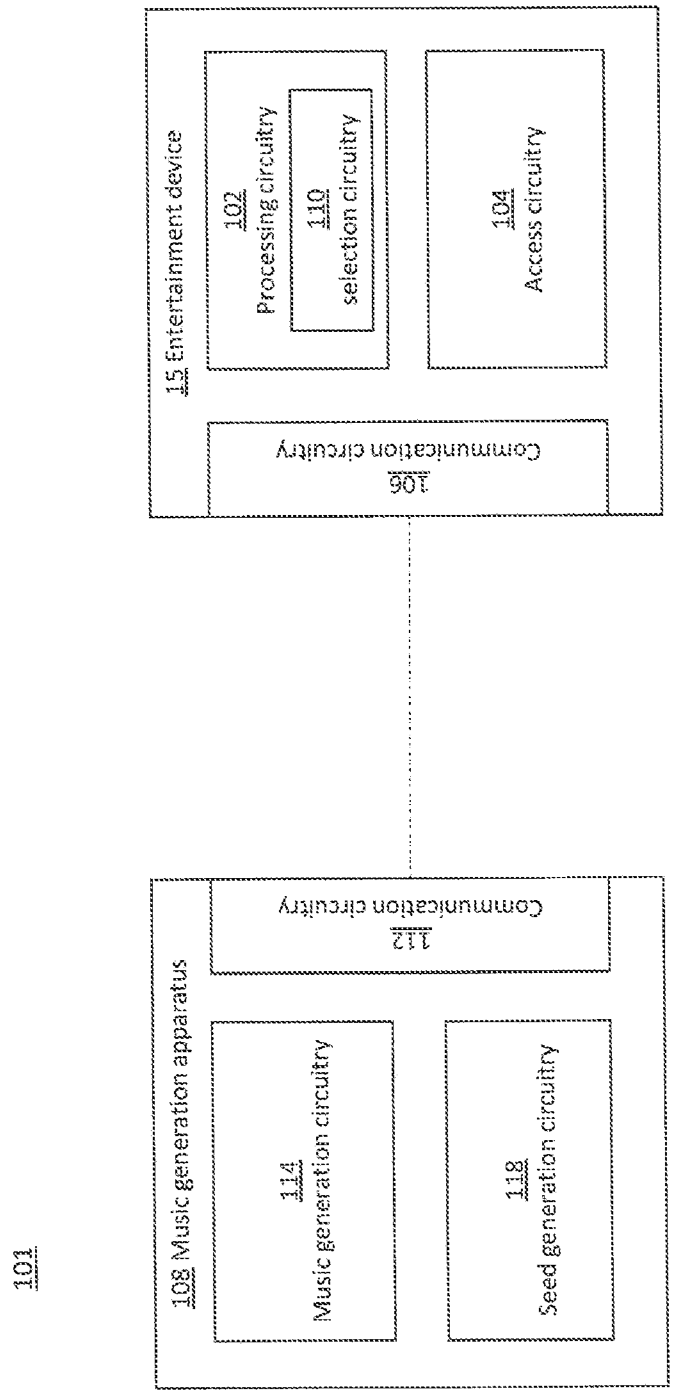
FIG. 2 shows an example of a system comprising an entertainment device and a music generation apparatus.

FIG. 2 illustrates a system 101 comprising the entertainment device 15 and a music generation apparatus.

The entertainment device 15 comprises processing circuitry 102 (e.g., this could include the CPU 20 and/or the GPU 30 shown in FIG. 1), access circuitry 104 (e.g., this could include the SSD access circuitry 55, the optical drive 70, and/or the data port 60) and communication circuitry 106 (e.g., which could include the data port 60). The entertainment device 15 may also include other components such as those shown in FIG. 1, but these have been omitted from FIG. 2 for clarity.

The entertainment device 15 is an example of an entertainment device comprising processing circuitry (processing circuitry 20, 30,102) to process a game state of a game based on game data and an action and/or a condition associated with a user playing the game, and selection circuitry (selection circuitry 110—discussed below in more detail) to select, during processing of the game, based on the action and/or the condition associated with the user, one or more keywords for use in generating a musical score for the game.

The entertainment device 15 communicates, using the communication circuitry 106, with a music generation apparatus 108. The music generation apparatus 108 may be a local device, in which case the entertainment device's communication circuitry 106 may communicate with the music generation apparatus 106 over a wired connection or short-range/local wireless connection (e.g., WiFi® or Bluetooth®). Alternatively, the music generation apparatus 108 may be provided within a remote server, accessible to the entertainment device over the internet—for example, the music generation apparatus 108 may be provided as part of a cloud service and may be accessible to multiple remote entertainment devices. In another example, the music generation apparatus 108 may be integrated with the entertainment device 15, in which case the communication circuitry 106 may be provided by the bus 100.

The music generation apparatus 108 is arranged to provide a personalised musical score for a game being processed by the entertainment device 15. Hence, the music generation apparatus is an example of a music generation apparatus for generating a musical score for a game. More particularly, the music generation apparatus may generate the musical score itself (e.g., the music generation apparatus 108 may generate and output an audio file comprising the musical score), or some representation of the musical score (e.g., the musical generation apparatus may generate and output a Musical Instrument Digital Interface (MIDI) file/stream representing the musical score) or similar. Hence, the music generation apparatus 108 generates and outputs information indicative of a musical score, which may or may not be the musical score itself. Therefore, it should be appreciated that where the terms "musical score" or "soundtrack" are used herein (i.e. in respect of the information generated and output by the music generation apparatus), this should be interpreted as also covering information indicative of the musical score.

The music generation apparatus 108 comprises communication circuitry 112 to communicate with the entertainment device 15, and the communication between the communication circuitry 106 of the entertainment device 15 and the music generation apparatus 108 includes requests, sent by the entertainment device 15, for the music generation apparatus to generate a musical score for a game. The communication also includes one or more keywords, selected by selection circuitry 110 (which may be part of or provided by the processing circuitry 102) for example based on input signals received from one or more input devices such as the one or more controllers 80 or the one or more HMDs 802, and/or in dependence upon all or part of the game state. Hence, the communication circuitry 112 of the music generation apparatus 108 is configured to receive a request to generate a musical score for a game, and to receive one or more keywords output by the entertainment device during processing of the game, the one or more keywords being indicative of an action and/or a condition associated with a user playing the game, and/or some or all of the game state itself. The input signals may include information relating to user actions (e.g., pressing buttons, moving joysticks, motion of hands or other body parts, etc.) and optionally physiological data relating to the user.

The music generation apparatus 108 also includes music generation circuitry 114, which is responsive to the request to begin generating information indicative of the musical score, and is responsive to receiving each of the one or more keywords to update the generation of the information indicative of the musical score based on such keywords. In particular, the music generation circuitry 114 is responsive to the communication circuitry 112 receiving the request to generate a musical score to begin generation of the information indicative of the musical score, based on information provided in the request. The information indicative of the musical score is then output, as it is generated, to the entertainment device 15 via the communication circuitry 112 of the music generation apparatus.

The information indicative of the musical score is initially generated based on information provided in the request; for example, the request may optionally identify the game being played (although may not be necessary if the instance of the music generation apparatus is specific to the game), and may similarly optionally identify information about the user or a user profile associated with the user—this allows the musical score to be personalised to the particular game and to the individual user. However, as one or more keywords are received by the communication circuitry 112, the music generation circuitry 114 responds by updating its generation of the information indicative of the musical score based on the keywords. This provides a musical score that is personalised to the game, the user, and the user's interactions with and reactions to the game.

Note that, in some cases communication between the entertainment device 15 and the music generation apparatus 108 may not flow directly from one apparatus to the other, but instead may be transmitted via one or more intermediate devices.

Figure 3:
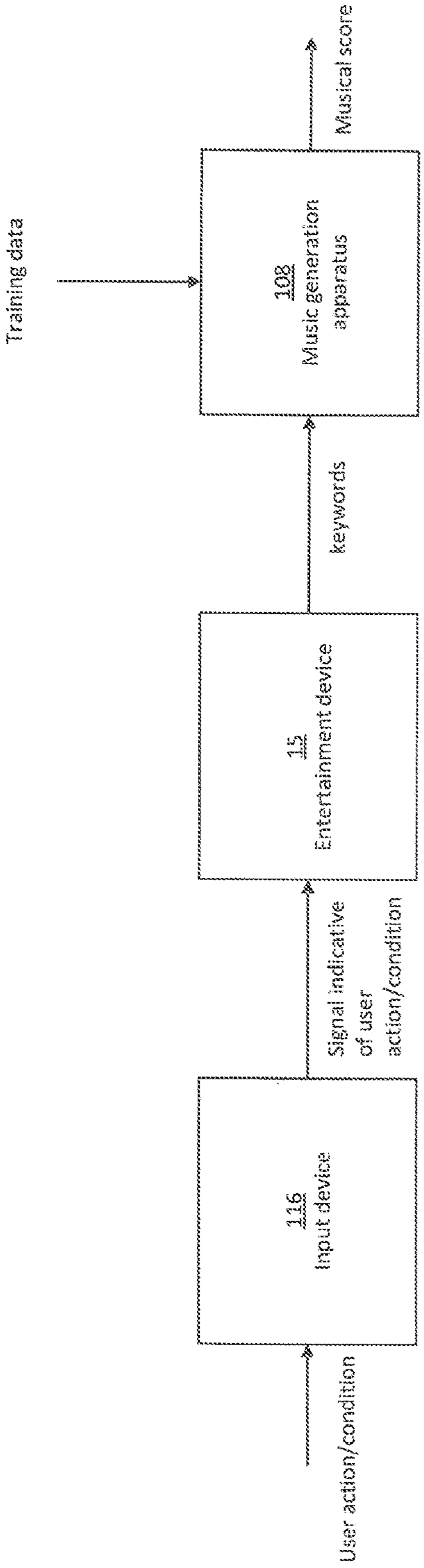
FIG. 3 illustrates a process by which a music generation apparatus generates information indicative of the musical score.

The process by which the music generation apparatus 108 generates the information indicative of the musical score is shown in FIG. 3. In this example, the music generation apparatus 108 implements a machine learning (ML) or artificial intelligence (AI) program.

The inventors of the present technique realise that an AI or ML program could provide a solution to the problem of how to create a musical score with a greater degree of personalisation since, in principal, a properly-trained AI can provide an infinite amount of personalisation when generating the information indicative of the musical score. However, implementing an AI for this purpose is non-trivial, particularly when defining the input data for the AI. In particular, the inventors of the present technique recognised that defining the input data for the AI, in order to ensure that the generated musical score can reflect the user's interactions with and reactions to a game, requires more than simply feeding input data from an input device 116 (e.g., a controller 80 or HMD 802) into the AI, since this information only identifies information about the user, not how the user interacts with the game. For example, if a user presses a particular button on a controller, this fact alone does not identify how they are interacting with the game—their interaction with the game is also defined by the state of the game itself, other actions taken immediately before or after the user pressed the button, a stage of the game that the user is at, and so on. Defining input data for the AI that reflects all of these factors can be challenging.

One option might be to provide the AI with information about the game as it is played (e.g., some or all of the game state), in addition to providing the input data from the input device 116. However, communicating such a large amount of data would require the circuitry to provide a large bandwidth, which is not ideal. Moreover, training an AI to generate information indicative of a musical score from this data would be complex, because of the large amount of different combinations of user inputs, user conditions and game events for a single combination of user and game, let alone across a range of different users and different games. Such an AI would also require significant processing power. A similar consideration applies when providing the AI with the game state only.

However, the inventors have proposed a solution to this problem, which does not require such a large amount of data to be communicated between the entertainment device 15 and the music generation apparatus 108, and for which training the AI would be simpler. In particular, the inventors propose a solution whereby the entertainment device 15 is responsive to signals indicative of one or more of a user action, condition, or game state to select, from a pool of keywords defined (e.g., by a game developer) for an individual game, one or more keywords which represent the user's interaction with or reaction to the game, or the state of the game (e.g., a part thereof salient to the musical score, as explained later herein). The pool of keywords may be defined or refined for the particular game, and hence can be arranged to reflect the specific theme and scenarios provided by the particular game. Hence, when these keywords are provided by the entertainment device to the music generation apparatus 108, the AI can use these terms to generate the musical score. Moreover, the pool of keywords may also be specific to a particular user, as well as being specific to a particular game.

Accordingly, the present technique provides a mechanism that allows an AI/ML algorithm to be used to generate a highly personalised musical score, in terms of the user's inputs/reactions, and/or in terms of how the user chooses to progress the game.

The AI may be trained using training data which includes parts of musical scores/videogame soundtracks, coupled with corresponding keywords selected to reflect how the parts of the soundtracks could be used to represent various interactions of a user with a game, and/or game states. Moreover, the AI may continue to be trained as it is used—for example, a user may be asked, on occasion, to indicate whether they felt that the musical score being generated matched their mood and/or their interactions with the game. The user's responses to these questions may then be fed back to the AI to improve its model.

Returning now to FIG. 2, it is noted that the music generation apparatus 108 in this example also includes seed generation circuitry 118.

It will be appreciated that a fully trained AI is still typically a deterministic process; consequently for the same keyword prompts it may generate the same musical output, and indeed this may be a desirable property. However, this may become repetitive for the user, and/or make the process of associating keywords with the game state more onerous if the developer want to make music for similar states sound similar but not identical.

Adding a seed value to the AI input is similar to adding noise, and different seeds will result in different outputs from the AI for the same keywords. However, as the process is still deterministic, adding the same seed and key words will produce the same output again.

Hence the or each seed acts to vary the prompt and hence also the musical output. This may be used to simplify the keyword vocabulary, or the mark-up/association of keywords to user or game states, to create differences for the same keywords. Similarly a particular seed may be associated with a game title or a game developer and used to ensure that common keywords produce a musical score that is unique to that game (for example in the case where the AI is made available to multiple game developers, who would prefer not to have the same music output for their respective games).

Hence some seeds may be fixed throughout the game to make the game/developer's music repeatable but different to that of other games/developers, whist other seeds may vary or be random, or may be algorithmically generated based on the game state; for example the seed may be based on a location value, so that the resulting music is location specific as well as responsive to the selected keywords.

In this way, the generated music may be repeatable but unique to the game developer, game title, game location, or other aspect of game state (or user state), for the same keyword prompt.

The AI itself may be trained with seed inputs (e.g., random seed inputs) to learn the degree to which they should influence the output—e.g., the seed, which is typically semantically meaningless, should not outweigh the keyword (s) such that, for example, key words associated with a relaxing game state produce scary music, for example.

Figure 4:
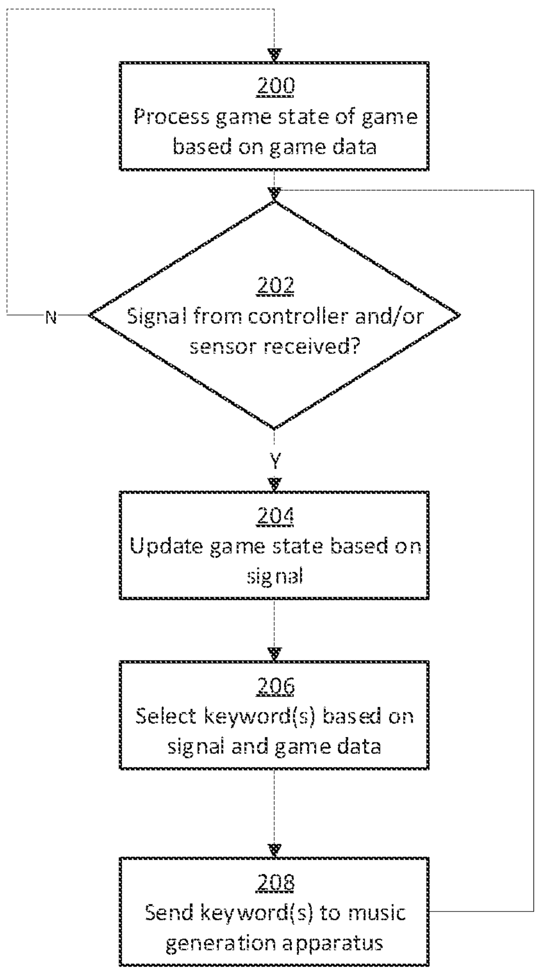
FIG. 4 is a flow diagram showing an example of a process carried out by an entertainment device.

FIG. 4 is a flow diagram showing an example of a process carried out by the entertainment device 15 described above. The method includes a step 200 of processing a game state of a game. In step 202, the entertainment device optionally determines whether a signal (e.g., indicative of a condition and/or action of a user) has been received from a controller and/or a sensor. If such a signal has not been received, the method returns to step 200. If such as signal has been received, the method includes a step 204 of updating the game state based on the signal. Alternatively or in addition the game state may update in any event, e.g., due to the actions of non-player characters in the game. In step 206, one or more keywords are selected based on the signal and/or the game data, and in step 208, the selected one or more keywords are sent to the music generation apparatus.

Figure 5:
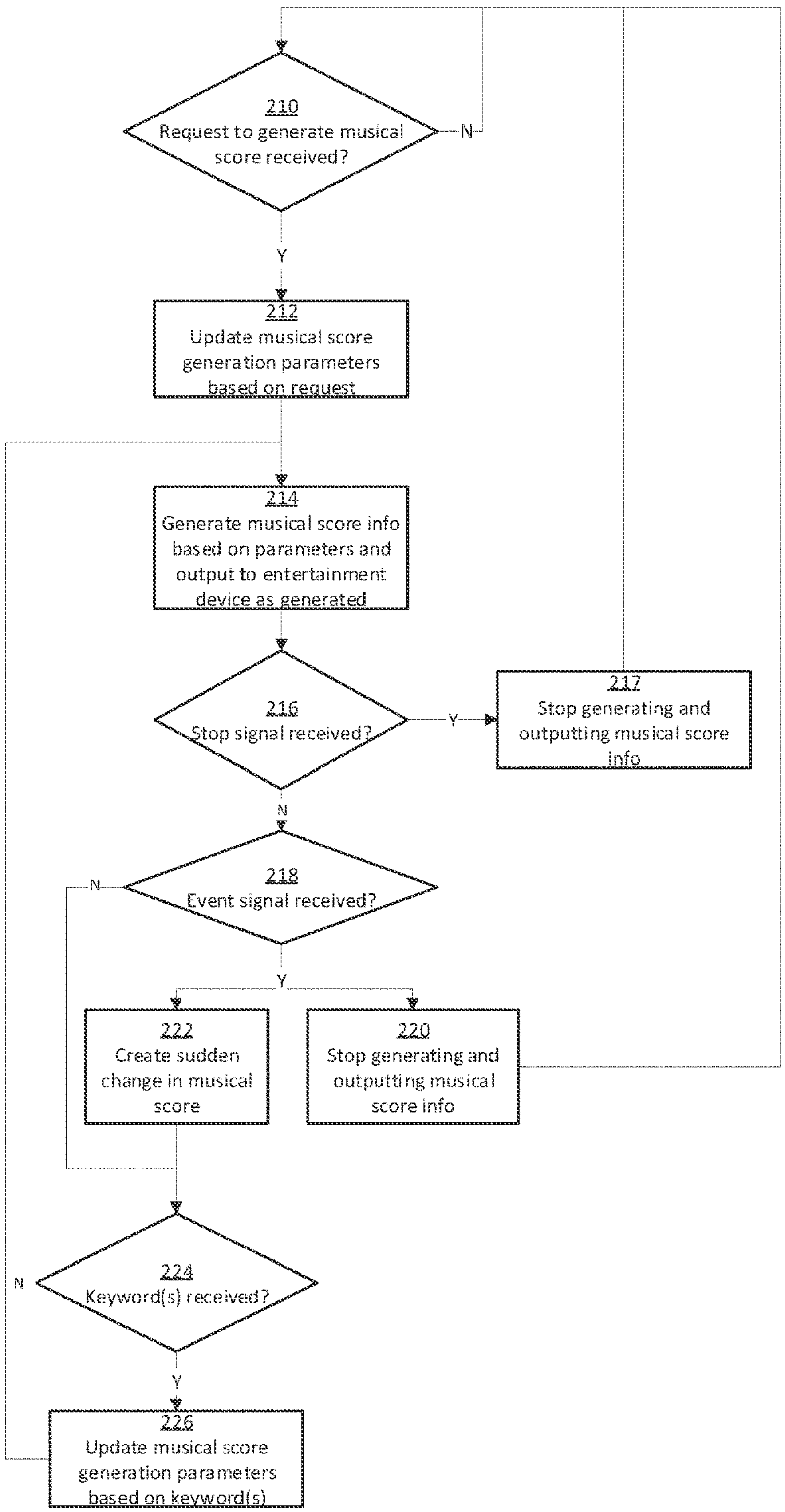
FIG. 5 is a flow diagram showing an example of a process carried out by a music generation apparatus.

FIG. 5 is a flow diagram showing an example of a process carried out by the music generation apparatus 108 described above. In step 210, it is determined whether a request to generate a musical score has been received. When it is determined that such a request has been received, the method includes a step 212 of updating a set of musical score generation parameters based on the request. In step 214, the music generation apparatus begins generating the information indicative of the musical score based on the parameters, and outputting the information indicative of the musical score as it is generated. Generating the information indicative of the musical score based on a set of parameters that are updated based on, for example, the request provides a mechanism for defining the input parameters for the music generation process. The combination with 212 and 214 in this example amounts to beginning the generation of a musical score (or information indicative of a musical score) based on the request.

In step 216, it is determined whether a stop signal has been received, indicating that generation of the information indicative of the musical score should be halted. For example, such a signal may be sent to the musical generation apparatus by the entertainment device in response to a game being paused or muted, or in response to an in-game event. When it is determined that a stop signal has been received, the method includes a step 217 of stopping (or pausing) generating and outputting the information indicative of the musical score. The method then returns to step 210, and waits for a further request or instruction to resume to be received. On the other hand, if it is determined that a stop signal has not been received, the method includes a step 218 of determining whether an event signal has been received—for example, the event signal may be received by the communication circuitry 112 of the music generation device.

For example, an event signal may indicate that a sudden in-game event has occurred, such as a jump scare. It can be desirable for the musical score to suddenly change in response to such an in-game event.

In absence of receiving the event signal, it is determined 224 whether one or more keywords have been received. If they have, the parameters used to generate the information indicative of the musical score are updated based on the keywords, and the method returns to step 214.

When an event signal is received, there are different options for how the music generation apparatus can respond. For example, in step 220, the music generation apparatus responds to the event signal by stopping/pausing the generation and output of the information indicative of the musical score, so that the entertainment device can switch to playing some pre-recorded content relevant to the event. The method then returns to step 210. Alternatively, in step 222, a sudden change (e.g., in style, tempo or volume) is created in the musical score, and the method continues to step 224.

It will be appreciated that such sudden changes may be musically discordant; in the case of jump scare this may be desirable, but more generally it is preferable for the musical score to segue smoothly between outputs responsive to different keywords. Consequently in embodiments of the description, optionally the AI is trained on common transitions between keywords, and may optionally include in its inputs both current keywords and one or more preceding keywords to provide context for such a transition.

Hence for example the AI may be trained on keywords including 'meadow' and 'cave', to generate distinctive atmospheric music for each of these environments. Subsequently when a user leaves a meadow to enter a cave, the AI has been trained to segue between these musical outputs.

The AI can be trained in this manner for common successions of keywords, either specific to the individual game, and/or more generally in terms of mood, style, tempo or the like, so that the musical score can flow pleasingly as the game unfolds and/or in response to player input/reaction.

As noted above, the keywords may for example be descriptive of the environment, but may more generally describe any aspect of the game or user state that may be considered relevant to the generation of a responsive musical score. Hence, as non-limiting examples, the keywords may describe one or more of the environment (countryside, urban, lush, desolate), the mood (pleasant, oppressive, scary), qualities of non-player characters (NPCs) or other objects that the user can see or interact with (e.g., friendly, enemy, key quest item), qualities of the player's in-game character (wizard, soldier) and/or current state (health level, skill level, weapon/equipment deployment), the user's inputs (e.g., their inputs/choices in response to the game state, the speed/accuracy of their inputs, involuntary inputs such as shakes or jumps detected by motion sensors), and the user's response (e.g., as detected by audio and/or video monitoring of the user, biofeedback measurements, etc.). Hence for a specific moment in the game, a plurality of keywords may be used to described the salient aspects of the game state.

The AI is, as noted elsewhere herein, trained on such keywords and corresponding example music. As noted elsewhere herein the training may also include one or more random seed inputs that act to vary the output, and during training the AI learns that these seeds are not correlated with the example music, but are in effect a noise within the input. Also as noted elsewhere herein the training may also include one or more prior keyword inputs, to train the AI for common musical transitions.

During gameplay, the game state may then be tagged with appropriate keywords to act as salient inputs to the music generating apparatus. For example locations, NPCs, objects, with user's character etc. may be tagged with keywords such as those above. These keywords may be fixed or vary depending on the progress of the game (for example an NPC may start friendly and then become unfriendly based on user actions). Hence the selection of the keywords may be fixed or may change depending on how the game unfolds, for example in response to a story within the game and/or in response to the user's actions in it. Such selections of keyword may be scripted/rule based. For NPCs, whose state may be complex, such keywords may be associated with dialogue trees, for example, so that the keywords reflect how the NPC is talking to the user's character.

FIGS. 4 and 5 illustrate specific examples of processes which can be performed by the entertainment device 15 and the music generation apparatus 108 respectively. However, more generally, the entertainment device may perform a method comprising the following steps: processing a game state of a game based on game data and an action and/or a condition associated with a user playing the game; and selecting (e.g., using as input), during processing of the game, based on one or more of the action and/or the condition associated with the user, and the game state, one or more keywords for use in generating a musical score for the game.

Moreover, the music generation apparatus performs a method which, in general, includes the following steps: receiving a request to generate a musical score for a game; receiving one or more keywords output by an entertainment device during processing of the game, the one or more keywords being indicative of one or more of an action and/or a condition associated with a user playing the game and the game state; in response to the request, beginning generating information indicative of the musical score for the game; and in response to receiving each of the one or more keywords, updating the generation of the information indicative of the musical score based on that keyword.

Either one (or both) of these methods can be implemented by a computer program—for example, a computer program may be stored on a transitory or non-transitory computer-readable storage medium, and may comprise instructions which, when executed on a computer, cause the computer to perform one of the above methods.

For clarity of illustration, elements illustrated in the figures have not necessarily been drawn to scale. Further, where considered appropriate, reference numerals have been repeated among the figures to indicate corresponding or analogous elements.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

Methods and systems are disclosed for . . . . In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In the present application, the words "comprising at least one of . . . " are used to mean that any one of the following options or any combination of the following options is included. For example, "at least one of: A; B and C" is intended to mean A or B or C or any combination of A, B and C (e.g., A and B or A and C or B and C).

Embodiments of the present disclosure may be implemented in accordance with any one or more of the following numbered clauses:

1. A music generation apparatus for generating information indicative of a musical score for a game, the music generation apparatus comprising: communication circuitry to communicate with an entertainment device, the communication circuitry being configured to receive a request to generate the information indicative of a musical score for a game, and to receive one or more keywords output by the entertainment device during processing of the game, the one or more keywords being indicative of one or more of an action and/or a condition associated with a user playing the game, and some or all of the game's state; and music generation circuitry responsive to the request to begin generating information indicative of the musical score, the music generation circuitry being responsive to receiving each of the one or more keywords to update the generation of the information indicative of the musical score based on that keyword.

2. The music generation apparatus according to clause 1, wherein: the communication circuitry is configured to receive an event signal indicative of a sudden event in the game; and the music generation circuitry is responsive to the event signal to: generate a sudden change in the musical score to coincide with the sudden event; or stop generating and/or outputting the information indicative of the musical score.

3. The music generation apparatus according to any preceding clause, wherein: the communication circuitry is configured to receive one or more seeds values; and the music generation circuitry is responsive to the or each seed to generate the information indicative of the musical score based on the or each seed in conjunction with the or each keyword.

4. The music generation apparatus according to clause 3, wherein: each seed of the one or more seeds is unique to one or more selected from the list consisting of: (i) a developer of the game; (ii) the game's title; and (iii) one or more aspects of the game's state.

5. The music generation apparatus according to any preceding clause, comprising: a machine learning system trained with one or more keywords as input and information indicative of a musical score as a target output.

6. The music generation apparatus of clause 5, in which the machine learning system has been trained with one or more current and preceding keywords as input and information indicative of a transition in musical score as a target output.

7. The music generation apparatus of clause 5 or clause 6, in which the machine learning system has been trained with one or more seed values as further input, the seed values being uncorrelated with the target output.

8. The music generation apparatus according to any preceding clause, wherein the music generation apparatus is provided as one of: a cloud server accessible to the entertainment device via an internet connection; local circuitry accessible to the entertainment device via a wired link or a short-range wireless link; or circuitry integrated with the entertainment device.

9. The music generation apparatus according to any preceding clause, wherein the music generation circuitry is configured to generate, as the information indicative of the musical score, a Musical Instrument Digital Interface, MIDI, file or stream.

10. A system comprising: the music generation apparatus of any preceding clause; and an entertainment device comprising: processing circuitry to process a game state of the game based on game data and the action and/or the condition associated with the user playing the game; and selection circuitry to select, during processing of the game, based on one or more of the action and/or the condition associated with the user, and the game state, the one or more keywords for use in generating information indicative of a musical score for the game.

11. A method for generating information indicative of a musical score for a game, the method comprising: receiving a request to generate information indicative of a musical score for a game; receiving one or more keywords output by an entertainment device during processing of the game, the one or more keywords being indicative of one or more of an action and/or a condition associated with a user playing the game and the game state; in response to the request and the or each keyword; and generating the information indicative of the musical score for the game based on the or each keyword.

12. A computer program comprising instructions which, when executed on the computer, cause the computer to perform the method according to clause 11.

13. An entertainment device, comprising: processing circuitry to process a game state of a game based on game data and an action and/or a condition associated with a user playing the game; selection circuitry to select, during processing of the game, based on one or more of the action and/or the condition associated with the user and the game state, one or more keywords for use in generating information indicative of a musical score for the game.

14. A method comprising: processing a game state of a game based on game data and an action and/or a condition associated with a user playing the game; selecting, during processing of the game, based on one or more of the action and/or the condition associated with the user and the game state, one or more keywords for use in generating information indicative of a musical score for the game.

The invention claimed is:

1. A music generation apparatus for generating information indicative of a musical score for a game, the music generation apparatus comprising:

one or more processors; and one or more computer-readable media having stored thereon computer-executable instructions that, when executed with the one or more processors, cause the music generation apparatus to:

communicate with an entertainment device, receiving a request to generate the information indicative of a musical score for a game, and during processing of the game, one or more keywords output that the entertainment device selects from keywords that are predefined for the game and indicative of one or more of a user action, a user condition, or a portion of the game's state; and responsive to the request, begin generating information indicative of the musical score and output the information to the entertainment device as it is generated, and responsive to receiving each of the one or more keywords, updating the generation in dependence on that keyword, and wherein the music generation apparatus is trained using current keywords and one or more preceding keywords to generate transitions that provide a smooth segue between different portions of the musical score.

2. The music generation apparatus according to claim 1, wherein the instructions further cause the music generation apparatus to:

receive an event signal indicative of a sudden event in the game; and responsive to the event signal to:

generate a sudden change in the musical score to coincide with the sudden event; or stop generating and/or outputting the information indicative of the musical score.

3. The music generation apparatus according to claim 1, wherein the instructions further cause the music generation apparatus to:

receive one or more seed values; and responsive to the or each seed value to generate the information indicative of the musical score in dependence on the or each seed value in conjunction with the or each keyword.

4. The music generation apparatus according to claim 3, wherein:

the or each seed value is unique to one or more of:

a developer of the game;

a title of the game; and one or more aspects of a game state of the game.

5. The music generation apparatus according to claim 1, comprising: a machine learning system trained with one or more keywords as input and information indicative of a musical score as a target output.

6. The music generation apparatus of claim 5, in which the machine learning system has been trained with one or more current and preceding keywords as input and information indicative of a transition in musical score as a target output.

7. The music generation apparatus of claim 5, in which the machine learning system has been trained with one or more seed values as further input, the seed values being uncorrelated with the target output.

8. The music generation apparatus according to claim 1, wherein the music generation apparatus is provided as one of:

a cloud server accessible to the entertainment device via an internet connection;

local circuitry accessible to the entertainment device via a wired link or a short-range wireless link; or circuitry integrated with the entertainment device.

9. The music generation apparatus according to claim 1, wherein the instructions further cause the music generation apparatus to generate, as the information indicative of the musical score, a Musical Instrument Digital Interface, MIDI, file or stream.

10. The music generation apparatus of claim 1, wherein the keywords are selected from a predefined pool of keywords configured for the game and further refined based on a profile associated with a user.

11. The music generation apparatus of claim 1, wherein the instructions further cause the music generation apparatus to receive a seed value that is unique to at least one of a developer of the game, a title of the game, or a location within the game, and the generation is based on the seed value and the keywords.

12. A method for generating information indicative of a musical score for a game, the method comprising:

receiving a request to generate information indicative of a musical score for a game;

receiving, during processing of the game, one or more keywords output that an entertainment device selects from keywords that are predefined for the game and indicative of one or more of a user action, a user condition, or a portion of the game's state;

responsive to the request, begin generating information indicative of the musical score and output the information to the entertainment device as it is generated; and responsive to receiving each of the one or more keywords, updating the generating in dependence on the keyword;

wherein a music generation apparatus is trained using current keywords and one or more preceding keywords to generate transitions that provide a smooth segue between different portions of the musical score.

13. A non-transitory machine-readable storage medium which stores computer software which, when executed by a computer, causes the computer to perform a method for generating information indicative of a musical score for a game, the method comprising:

receiving a request to generate information indicative of a musical score for a game;

receiving, during processing of the game, one or more keywords output that an entertainment device selects from keywords that are predefined for the game and indicative of one or more of a user action, a user condition, or a portion of the game's state;

responsive to the request, begin generating information indicative of the musical score and output the information to the entertainment device as it is generated; and responsive to receiving each of the one or more keywords, updating the generating in dependence on the keyword;

wherein a music generation apparatus is trained using current keywords and one or more preceding keywords to generate transitions that provide a smooth segue between different portions of the musical score.

* * * * *